April 28, 1936.   J. C. HEINTZ   2,038,736
WORK FITTER FOR TIRE VULCANIZERS
Filed June 20, 1935

Inventor
J. C. Heintz.
By Robert M. Pierson,
Attorney

Patented Apr. 28, 1936

2,038,736

UNITED STATES PATENT OFFICE 2,038,736

WORK FITTER FOR TIRE VULCANIZERS

James C. Heintz, Lakewood, Ohio

Application June 20, 1935, Serial No. 27,514

7 Claims. (Cl. 18—18)

This invention, which relates to vulcanizing molds and particularly full-circle retreading vulcanizers for pneumatic tires, has for its object to provide improved means for fitting the work to the mold.

In such a vulcanizer, the walls of the molding cavity are usually constituted by metal rings formed with recesses to mold the non-skid projections on the rubber tread, and the ring or rings forming one half or slightly more than half of the cavity are in place when the rim-mounted tire bearing a raw tread is fitted in said cavity. Considerable force is required, particularly with the larger tires such as truck tires, to seat the tire in the mold, because of the fact that the thickness of tread stock required for a proper retreading operation demands that the uncured tread rubber shall partially enter the recesses of the molding rings during the fitting or seating operation. Heretofore, in the prevailing mode of fitting the work to a Heintz horizontal vulcanizer for example, the tire has been placed against the upper edge of the middle molding or spacer ring with its plane parallel with that of the vulcanizer and then, by means of inward radial pressure exerted by the operator on the tire tread, at one or more points around the latter, through a pry-bar stepped on said spacer ring and fulcrumed against the adjacent vulcanizer wall, the tire has been forced to its seat. The present invention provides a more advantageous application of prying or leverage force, involving the use of a novel appliance for exerting outward radial pressure and enabling the tire to be seated in a shorter time, with less manual effort, and with less opportunity for damaging the tire.

Figure 1:
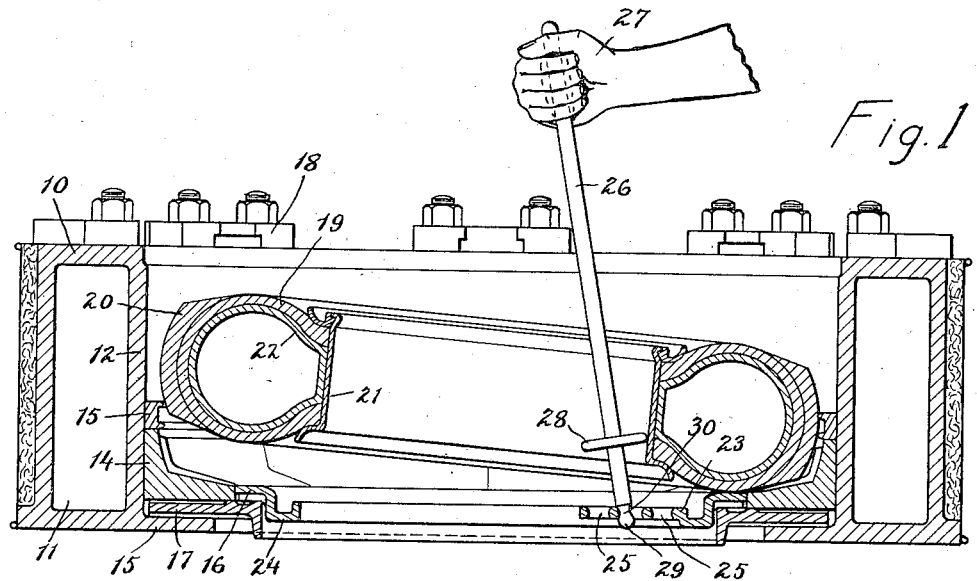

Of the accompanying drawing, Fig. 1 is a diametric vertical section of a portion of a full-circle retread vulcanizer showing a tire being fitted therein by means of my invention.

Figure 2:
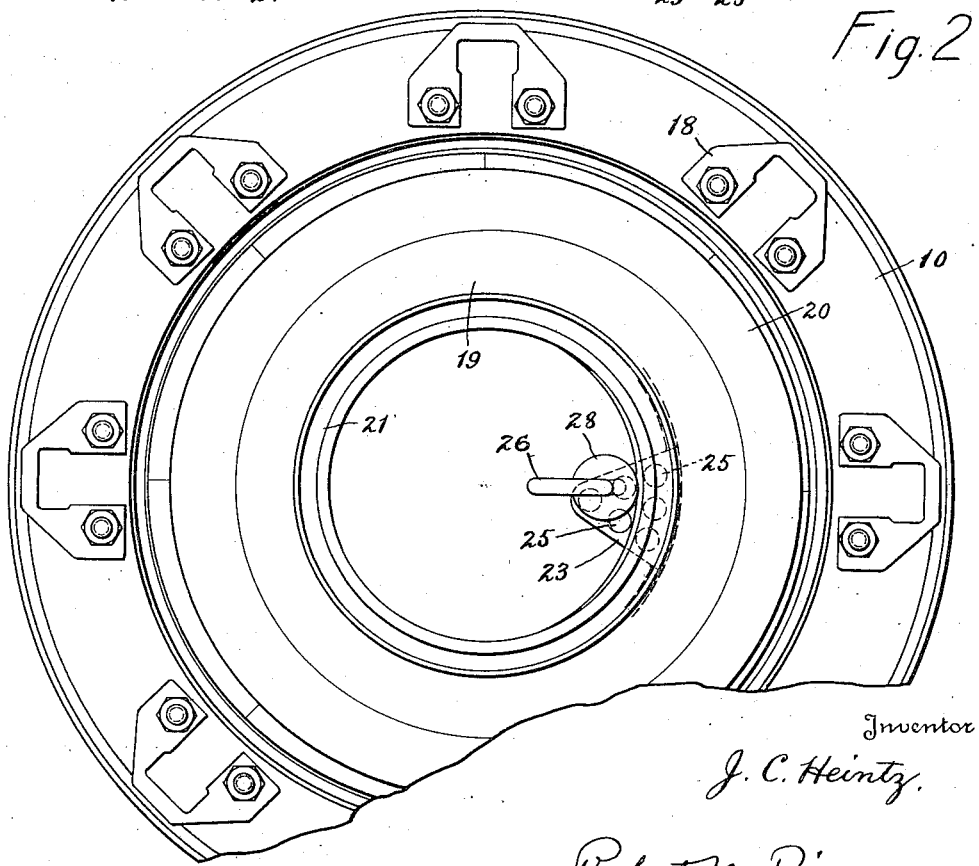

Fig. 2 is a top plan view, partly broken away.

The drawing illustrates a known type of vulcanizer including a retread mold open at its inner periphery, substantially as disclosed in my Patent No. 1,810,963 of June 23, 1931, but it will be understood that the invention may be used in connection with other types. 10 is a vulcanizer casing including an annular steam-heating chamber 11 having a cylindrical inner wall 12 and an inwardly projecting horizontal base flange 13 for supporting the rings which define the molding cavity. There are here shown the lower-side matrix ring 14 and the middle matrix or spacer ring 15, usually divided radially into segments and receiving their heat mainly by radial conduction from the vulcanizer wall 12, together with a continuous lower side-wall ring 16 which is maintained below a vulcanizing temperature, and a continuous ring 17 resting on the flange 13 for supporting the matrix ring assembly. These rings are in place when the tire is fitted, after which the molding cavity is completed by inserting a separable upper matrix ring corresponding to 14, together with an upper side-wall ring, and suitable screw clamps are fitted in holders 18 for exerting a clamping pressure upon the ring assembly during the vulcanizing operation.

19 is the pneumatic tire casing bearing a raw tread 20 and mounted on a rim 21, together with the usual inner inflatable curing tube 22.

According to this invention, the novel work-fitting appliance comprises a suitable fulcrum means and a lever for exerting outward radial or diametric pressure upon the tire rim 21. In the preferred embodiment here illustrated, the fulcrum means comprises a horizontal triangular plate 23 conveniently formed as an inward radial projection or member integral with the cooling-water trough 24 which constitutes a part of the lower side-wall ring 16, but it will be understood that this fulcrum member could be otherwise mounted and that its mounting might vary with the particular type of vulcanizer. The plate 23 is formed with a number of perforations 25 for the reception of the lower end of the prying tool, said perforations being distributed both circumferentially and radially, in this case in three rows, to accommodate the different diameters of rims 21 of various sizes of tires which may be retreaded in the same vulcanizer, and to place the fulcrum point in a selected circumferential location within the plate limits.

The preferred prying tool consists of a straight lever bar 26 whose upper end constitutes a handle to be grasped by the hand 27 of the operator, said bar having affixed near its lower end a circular rim-contacting flange, disk or collar 28 and having at its lower end a small fulcrum head or knob 29 and an adjacent circumferential groove forming a reduced neck 30, for engaging any of the fulcrum points constituted by the inner walls of the perforations 25. By this formation the operator is enabled to detachably engage the lever bar 26 with the stationary fulcrum member 23 at a selected fulcrum point on the latter, and to exert the necessary prying force upon the work, in any rotary position of the prying tool, without loss of time in adjusting the tool to a specific rotary position. He can also readily cant the tool from a vertical plane if desired.

In operating my invention, the rim-mounted tire, supported by a suitable tackle, is lowered into the mold with its plane at an angle to that of the vulcanizer so that the tire may bottom on one side against the mold as illustrated in Fig. 1. Then the operator engages the lower end of the lever bar 26 with the fulcrum plate 23 at a selected hole 25 in the latter, brings the contact flange 28 against the inner periphery of the tire rim 21 as best shown in Fig. 1, swings said tool by an outward pull and thereby exerts a diametric or radial outward pressure to shift the tire and force its tread 20 on the low side diametrically against the mold members 14 and 15 so that the tread rubber will partially enter the non-skid recesses of said members. While this pressure is maintained, the same or a second operator, by manual downward pressure exerted at other points including the opposite side of the tire, aided by the weight of the tire, forces the latter to fit the mold at all points in the circle, with its plane parallel to that of the vulcanizer, after which the prying pressure is removed to allow the tire to center itself in the mold. The prying tool is then removed, the upper side of the mold is inserted, the clamps are mounted and screwed down to hold the mold rings together, the tire is inflated to full vulcanizing pressure and the tread-vulcanizing operation is proceeded with.

It will be understood that the described form of embodiment may be more or less varied without departing from the scope of my invention as defined in the claims.

I claim:

1. Full-circle tire retread apparatus comprising a vulcanizer including an annular tire-vulcanizing mold having separable sides and open at its inner periphery for receiving a rim-mounted tire, fulcrum means associated with said vulcanizer and accessible through the central space of a tire in the mold, and lever means coacting with the fulcrum means for engaging the rim of the tire to shift said tire by outward radial pressure and force its tread diametrically against the mold.

2. Apparatus according to claim 1 in which the lever means is detachable from the fulcrum means.

3. Apparatus according to claim 1 in which the fulcrum means is a plate carried by the vulcanizer and having a plurality of fulcrum points engageable by the lever means in different relations of the latter to the vulcanizer.

4. Apparatus according to claim 1 in which the fulcrum means is a plate formed with a plurality of apertures distributed both circumferentially and radially to provide a corresponding number and relative position of fulcrum points for the lever means.

5. Apparatus according to claim 1 in which the vulcanizer is placed horizontally and its mold provided with a lower side-wall ring, and the fulcrum means is a perforated plate formed on said ring and projecting radially inward therefrom.

6. Tire retread apparatus comprising a vulcanizer having a tread mold for receiving a rim-mounted tire, fulcrum means on said vulcanizer, and means positioned to engage the inner periphery of the tire rim and including a lever engaging said fulcrum means to force said tire by outward radial pressure against the mold.

7. Tire retread apparatus comprising a vulcanizer including a full-circle mold having a lower-side recessed tread-molding portion and adapted, on that side of the open mold, to support a rim-mounted tire bearing a raw tread, with its plane inclined to that of the mold side, and means mounted on the vulcanizer when the mold is open and operable on the tire rim in the absence of the upper mold portion for forcing the tire at its deeper-entering portion radially against said lower-side mold portion, thereby allowing said tire to enter the mold more freely at other portions.

JAMES C. HEINTZ.